United States Patent
Nishihara et al.

(10) Patent No.: US 6,859,823 B1
(45) Date of Patent: Feb. 22, 2005

(54) WORKFLOW SERVER AND WORKFLOW SYSTEM CONTROL METHOD

(75) Inventors: Hiroshi Nishihara, Yokohama (JP); Tetsuya Watanabe, Yokohama (JP); Yoshiyuki Yamaguchi, Kawasaki (JP); Takayuki Yokoyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/514,945

(22) Filed: Feb. 28, 2000

(30) Foreign Application Priority Data

Mar. 3, 1999 (JP) .......................................... 11-056157

(51) Int. Cl.[7] .............................................. G06F 15/16
(52) U.S. Cl. ...................... 709/217; 709/203; 709/218; 709/223; 709/224; 700/99; 700/100; 700/9
(58) Field of Search ................................ 709/203, 217, 709/218, 223, 224, 99, 100; 705/8, 9; 700/99, 100, 9; 719/217, 218

(56) References Cited

U.S. PATENT DOCUMENTS 5,848,271 A * 12/1998 Caruso et al. .............. 712/220
6,115,640 A * 9/2000 Tarumi ......................... 700/99
6,334,133 B1 * 12/2001 Thompson et al. ....... 707/104.1

FOREIGN PATENT DOCUMENTS

| EP | 774725 | 5/1997 |
|----|--------|--------|
| JP | 8287162 | 11/1996 |

* cited by examiner

Primary Examiner—Frantz B. Jean
Assistant Examiner—Kevin Parton
(74) Attorney, Agent, or Firm—Antonelli, Terry, Stout & Kraus, LLP

(57) ABSTRACT

A workflow server is provided with, in association with a user management table 100 for managing work items for each user, a list 130 of substitute users for indicating a substitute user for each work or process and a list 140 of users in charge who designates the user as a substitute. When a client terminal user selects a specific user among the users in charge on the list 130, the workflow server checks the power of substitute by referring to the list 140 of substitute users for the selected user, thereby to allow the client terminal user to process a predesignated unprocessed work item instead of the selected user in charge.

9 Claims, 11 Drawing Sheets

710 ORGANIZATION CHART
720 MEMBER LIST

WORKFLOW SERVER AND WORKFLOW SYSTEM CONTROL METHOD

BACKGROUND OF THE INVENTION (1) Field of the Invention

The present invention relates to a workflow system and, more particularly, to a workflow server and work flow system control method for allowing another designated user to process a business work item when a user in charge is absent.

(2) Description of the Related Art

A workflow system is a computer network system developed for efficiently processing office work to which a plurality of people are related in a time sequence manner. By predefining the flow of each work item generated in the form of an electronic document in office work, a work item processed by a client terminal is automatically transferred to the persons in charge one after another on the downstream side of the work flow.

The workflow system comprises, for example, a plurality of client terminals connected to each other via a communication network such as a LAN, and a workflow server for communicating with each of the client terminals via the communication network. The work (business process) is predefined in a process management table of the workflow server. "Work" in the specification denotes office work such as ordering of materials and settlement of travel expenses. The work includes processes such as proposal, examination, and approval allocated to the user or application in each client terminal.

A new work item (electronic document) created by a client terminal or a work item which is transferred from another user and additionally processed by a client terminal is automatically sent to a person in charge in the next step of the workflow under the control of the workflow server.

In the specification, identification of each work in a workflow system is defined as "process ID", each electronic document generated in work is defined as a "work item" and each of a series of processing steps of the workflow is defined as a "node". When an individual is designated as the destination of the work item at each node, the individual is referred to as "user". When a group consisting of a plurality of users having the same role is designated as a unit and a work item is transferred to one of the plurality of members belonging to the group, it is referred to as "role".

In the workflow system, when the user (user in charge) as the destination of a work item is absent due to business trip, holiday, or the like, it is desirable to enable the work item to be processed by another user (substitute) in order to avoid a delay in the work.

In a conventional workflow system which enables a work item to be processed by a substitute user, for example, as disclosed in Japanese Unexamined Patent Application No. 10-177603, by the configuration described hereinafter, each user designates a substitute user for each work item and a work item is automatically distributed to the substitute user when the user in charge is absent.

In the conventional system, a workflow server has a process management table, a role management table, and a user management table. The process management table defines, for each of nodes constructing a business process, role ID, type of initial destination for designating either the user or role as the first destination of a work item, and type of destination at the time of a failure for designating either the user or role as the next destination when the transmission of the work item to the initial destination fails. The role management table defines IDs of users belonging to each role ID. The user management table stores information indicating whether or not a work item can be accepted every user ID. Each user designates whether work items can be accepted by his/her receiving tray, and a substitute user who should process a work item for the user in the user management table in correspondence with the role ID.

When a transition command with respect to a processed work item is received from a client terminal, the workflow server refers to a record of the next node of a process corresponding to the work item in the process management table. When "role" is designated as the type of the initial destination, the work item is transmitted to the corresponding role. When "user" is designated as the type of the initial destination, the workflow server refers to the role management table corresponding to the role ID defined in the record and, on the basis of the first user ID defined in the role management table, refers to the corresponding user management table.

When the status of accepting the work item with respect to the role ID is "acceptable" in the user management table, the work item is sent to the user in charge specified by the user ID. When the accepting status is "unacceptable" and substitute ID is designated, the user management table of the substitute user is referred to and the accepting status of the substitute user regarding the role ID is checked. When the receiving status of the substitute user is "acceptable", the work item is sent to the substitute user.

If the first user does not designate a substitute user in the user management table or if the accepting status of the designated substitute user is "unacceptable", the initial sending of the work item fails. In this case, the workflow server determines the next destination in accordance with "destination at the time of a failure" in the process management table. When the destination at the time of a failure is "role", the work item is sent to the role. In the case of "user", a process similar to that of the first user is performed to the next user defined in the role management table.

SUMMARY OF THE INVENTION

In the conventional workflow system, a work item is automatically transferred to a predesignated substitute user when a user in charge is absent and each of users including the substitute user processes work items accumulated on his/her receiving tray. Each of the users is therefore obliged to change a work item accepting status from "acceptable" to "unacceptable" with respect to role ID desired to be processed by a substitute user before the user becomes absent. When the user cannot operate his/her terminal due to sudden business trip, unexpected absence because of sickness, or the like, since the workflow server transfers work items on the basis of the user management table which is not updated, the work items are accumulated one after another on the tray of the absentee. There is consequently a problem that the work is stopped at the node where the absentee is positioned.

In the conventional substitute process system, even if the delay in the work item at the node where the user in charge is absent can be recognized, an access by other users to the work item accumulated in the receiving tray of the absentee is inhibited by the security function. There is consequently a problem such that the work items cannot be processed even by the predesignated substitute user.

In the field of electronic mails, for example, as disclosed in Japanese Unexamined Patent Application No. 3-223946, a technique in which a rightful person (the person himself/herself) and a substitute are preregistered in association with a mail box for an individual, the mail box is accessed by the registered substitute while the rightful person is absent, and the substitute processes an electronic slip received by mail for the rightful person and transmits the electronic slip to the next processing division is known.

According to the substitution system, however, the substitute can access all mails received in the personal mail box. Only work items limited to a specific business process among the received mails cannot be permitted to the substitute. Since the known technique is intended for electronic mails, the person in charge himself/herself has to transmit the processed electronic slip by specifying the next destination of the processed electronic slip. The object of the known technique is therefore different from that of the workflow system.

An object of the present invention is to provide a workflow system and server in which a work item sent to an absentee (user in charge) can be processed by a substitute user predesignated for each process.

Another object of the invention is to provide a flexible workflow system and server in which work items received by a user in charge who is present can be processed by both the user in charge and a substitute user predesignated for each process.

Further another object of the invention is to provide a workflow system having a user interface which facilitates a substitute user to easily read a work item received by another user in the case of processing the work item and a control method.

In order to achieve the objects, according to the invention, there is provided a workflow server which is connected to a plurality of client terminals for processing an electronic document generated as a work item corresponding to a business process and which transfers a work item generated or processed at each of the client terminals to a next user in charge in accordance with a prespecified process flow every work, comprising: controller for allowing, with respect to at least one work item, both a user in charge to whom the work item is transferred and a substitute user predesignated by the user in charge every work or process to access the work item and to directly or indirectly transfer the work item processed by either user to the next user in charge.

According to the above configuration, the work item can be processed by the predesignated substitute user when the user in charge is absent. When the user in charge is present, both the user in charge and the substitute user can process the work item. Consequently, when there are a number of work items accumulated, the work items can be divided by both of them. According to the above configuration, even after the substitute user is designated, work items are accumulated on the receiving tray of the user in charge. Therefore, before the user becomes absent or when the user returns to his/her desk, the user does not have to change the acceptance status regarding work items.

When the substitute user is delegated, the work item processed by the substitute user is automatically transferred to the next user in charge designated in the workflow. If the power of substitution is limited, for example, an indirect transfer of transferring the work item to a responsible person and, after being approved by the responsible person, transferring the work item to the next user in charge can be employed.

According to another feature of the invention, the workflow server is provided with means for displaying on a client terminal, in response to a request from any of the client terminals, a list of users (persons in charge) who are designating the user of the request source client terminal as a substitute.

The user in charge can be specified, for example, by sequentially searching a user management table which stores management information of each user of client terminals when one of the client terminals requests display of a user in charge. If a user name or user ID is registered in the list of users in charge linking with the user management table of the substitute user at the time of designating the substitute, when the client terminal requests display of the user in charge, the name of the user in charge can be instantaneously displayed on the terminal of the request source by referring to the list of the users in charge of the request source user.

According to another feature of the invention, the workflow server has a user management table linked to management information regarding each user of the client terminal, for storing information regarding a substitute user designated by the user in association with each work or process. When any of the client terminals requests display of a work item to be performed by the user as a substitute and specifies another user as a user in charge, the controller checks the power or qualifications for a substitute on the request source client terminal user by referring to the user management table corresponding to the user in charge and specifies work items to be performed by the substitute user and to be displayed.

The substitute user can be designated by, for example, entering the identifier of the substitute user for each work or process in the substitute user designating dialog box displayed on the client terminal. Alternatively, for example, a method of forming a member list by using organization information of a company and selecting a substitute user from a plurality of members displayed in the dialog box, a method of entering the qualifications of a substitute user in a logical formula and automatically extracting the corresponding user from the organization information, or the like may be employed.

In a preferable embodiment of the invention, in order to prevent an improper substitute from being designated by the user in charge, the qualifications for a substitute user are preset for each of the nodes of a business process. The controller checks whether each substitute user designated by a user in charge satisfies the qualifications or not. If it is improper, the substitute user is changed.

According to further another feature of the invention, the workflow server has a user information memory for storing a list of work items transferred to the user, identification information of a substitute user designated for each work or process by the user, and identification information of a user in charge who designates the substitute user in association with identification information of each user of the client terminal. When a request of starting the substitution process with respect to a work item to be processed by another user is received from a user other than the user in the destination of the work item, the controller of the workflow server creates a dialog box for selecting a user in charge on a display of the client terminal as a request source on the basis of identification information of the user in charge stored in said user information memory corresponding to the request source user. When a user in charge is designated by the request source user, the qualification of the request source user for a substitute user is checked by the controller of the workflow server and thereafter work items which are permitted to be processed by the request source user are specified by referring to information stored in the user information memory corresponding to the designated user in charge.

In a preferred embodiment of the invention, the user information memory stores at least one of power of substitute, substitution conditions, and substitution effective term besides identification information of the substitute user designated by each user for each work, and at the time of confirming qualifications for a substitute user of the request source user, the controller of the workflow server checks whether the identification information of the user has been registered in advance or not and at least one of the power of substitute, substitution conditions, and substitution effective term, thereby to limit the range of the work items to be processed by a substitute.

More specifically, the workflow server according to the invention comprises: a process management table defining the relation between an identifier of each of nodes constructing a business process and a destination of a work item in correspondence with a business identifier; a user information management table for storing, in correspondence with an identifier of a user who operates the client terminal, an identifier of an unprocessed work item, an identifier of a substitute designated by the user for each work or process, and an identifier of a user in charge indicative of another user who designate the client terminal user as a substitute; a work item management table for storing, in correspondence with a work item identifier, an identifier of a business process to which the work item belongs and an identifier of an node indicating the present position of the work item; and a controller for allowing both the user in charge who has not yet processed a work item in the user management table and a substitute user registered as a substitute in correspondence with the business process identifier of the work item in the user management table of the user in charge, specifying a next node identifier and a destination user from the process management table in accordance with the business process identifier of the work item and the identifier of the node in the present position with respect to the work item processed by the client terminal, registering the work item as an unprocessed work item in another user management table corresponding to the destination user, and updating the identifier of the node indicative of the present position to the identifier of the next node in the work item management table corresponding to the work item.

According to the invention, there is provided a method of controlling a workflow system including a plurality of client terminals and a workflow server for transferring a work item generated or processed by any of the client terminals to a next user in charge in accordance with a predesignated process flow, the method comprising the steps of: requesting from any one of the client terminals to said workflow server to display a work item to be performed by a substitute by specifying a user in charge; selecting by said workflow server an unprocessed work item of a specific work which can be processed by the request source client terminal user as a substitute from work items unprocessed by the user in charge: and displaying the selected work item on the request source client terminal.

According to another feature of the method of controlling the workflow system of the invention resides in that, when a request of display of a user in charge is issued from any one of the client terminals, the workflow server specifies at least one of users in charge who designates the request source client terminal user as a substitute on the basis of management information prepared for the user of each of the client terminals and displays the user in charge on the request source client terminal, thereby enabling the substitute user to designate the user in charge on the display screen.

As an additional function, the workflow server according to the invention has a function of recording history information indicative of the processing history of the work item at each node of the nodes into the work item management table.

The workflow server may be provided with, as a further another additional function, a function of transmitting a message of reminding the process of a work item to be urgently processed to at least one of a client terminal operated by a user in charge which is a destination of the work item and a client terminal operated by a substitute user designated as a substitute of the work item.

The reminder message is issued by the workflow server, for example, with respect to a work item pointed out by another user, a work item which elapses a predetermined threshold time since it has been transferred to a user in charge, or a work item received by a user who has accumulated a number of work items over a predetermined threshold.

The reminder message is sent a few times to, for example, a user who is recognized as absent by a schedule management system, a user who has not accessed the workflow server for a predetermined time or longer, or a user who has not processed the urgent work item within a predetermined time. When there is no response, the reminder may be sent to the substitute user.

By providing the additional functions for the workflow server, according to the workflow system of the invention, a user related to the process on the work item can easily recognize the status of the work item to which the user is related. By reminding the process pointed out by the related user or reminding the process by automatic detection with respect to a delayed work item, the process on the work item by the user in charge and the substitute user can be quickened. In order to limit execution of the work item process by the substitute user, only a user who receives the reminder message from the workflow server may be permitted to process the work item for the user in charge.

DESCRIPTION OF THE PREFERRED EMBODIMENTS

Embodiments of the invention will be described in detail hereinbelow with reference to the drawings.

Figure 1:
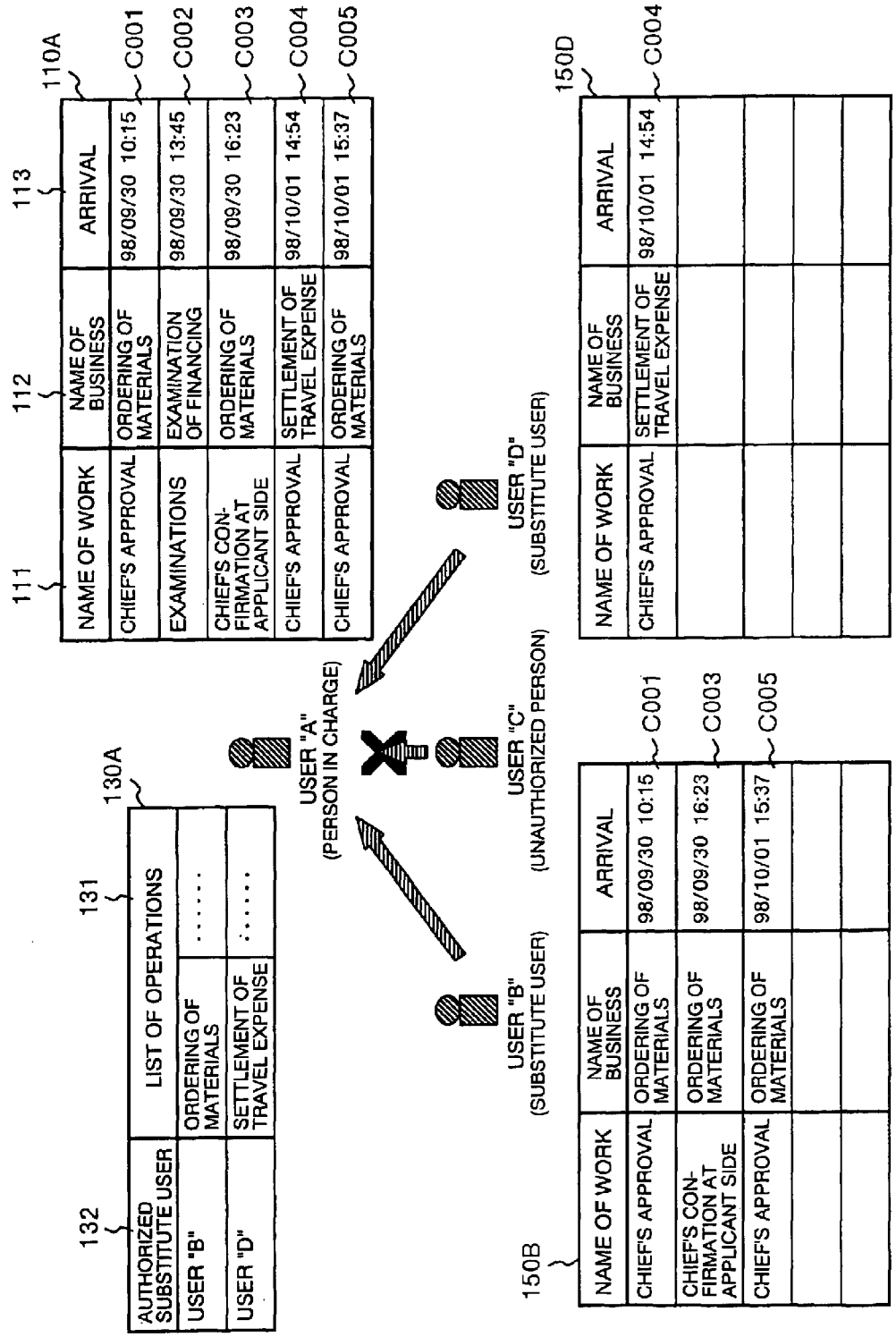
FIG. 1 is a diagram for explaining an outline of a workflow system according to the invention.

FIG. 1 is a diagram for roughly explaining the functions of a workflow server according to the invention. The diagram shows the relation between work items accumulated on a tray of a user A and work items to be processed by other users B and D predesignated by the user A when the user A is absent.

Reference numeral 110A denotes a display window showing a list of work items accumulated on the tray of the user A. In the list of work items, name 111 of work, name 112 of business, and arrival date and time 113 are shown for each work item. In the example, the user A has five unprocessed work items C001 to C005. The unprocessed work items are classified by work as follows; three work items C001, C003, and C005 of "ordering of materials", one work item C002 of "examination of financing" and one work item C004 of "settlement of travel expense".

Reference numeral 130A illustrates an outline of a list of substitute users, showing the relation between a substitute user 132 predesignated by the user A and an operation 131 to be performed by the substitute user. In the example, the user A assigns the user B the "ordering of materials" and assigns the user D the "settlement of travel expenses".

Reference numerals 150B and 150D illustrate windows each showing a list of substitute work items displayed on the screens of the terminals of the users B and D designated as substitute users of the user A. As obviously understood from the contents of the substitute work item list window, the three work items C001, C003, and C005 of the "ordering of materials" assigned by the user A in the list 130A of substitute users are displayed for the user B. One work item C004 of "settlement of travel expenses" assigned in the list 130A of substitute users is displayed for the user D. Each of the users B and D is authorized to process the specific work items displayed on the window of the list of work items for the user A who is absent. Since the user C is not designated as a substitute, the user C cannot access the work items of the user A.

Figure 2:
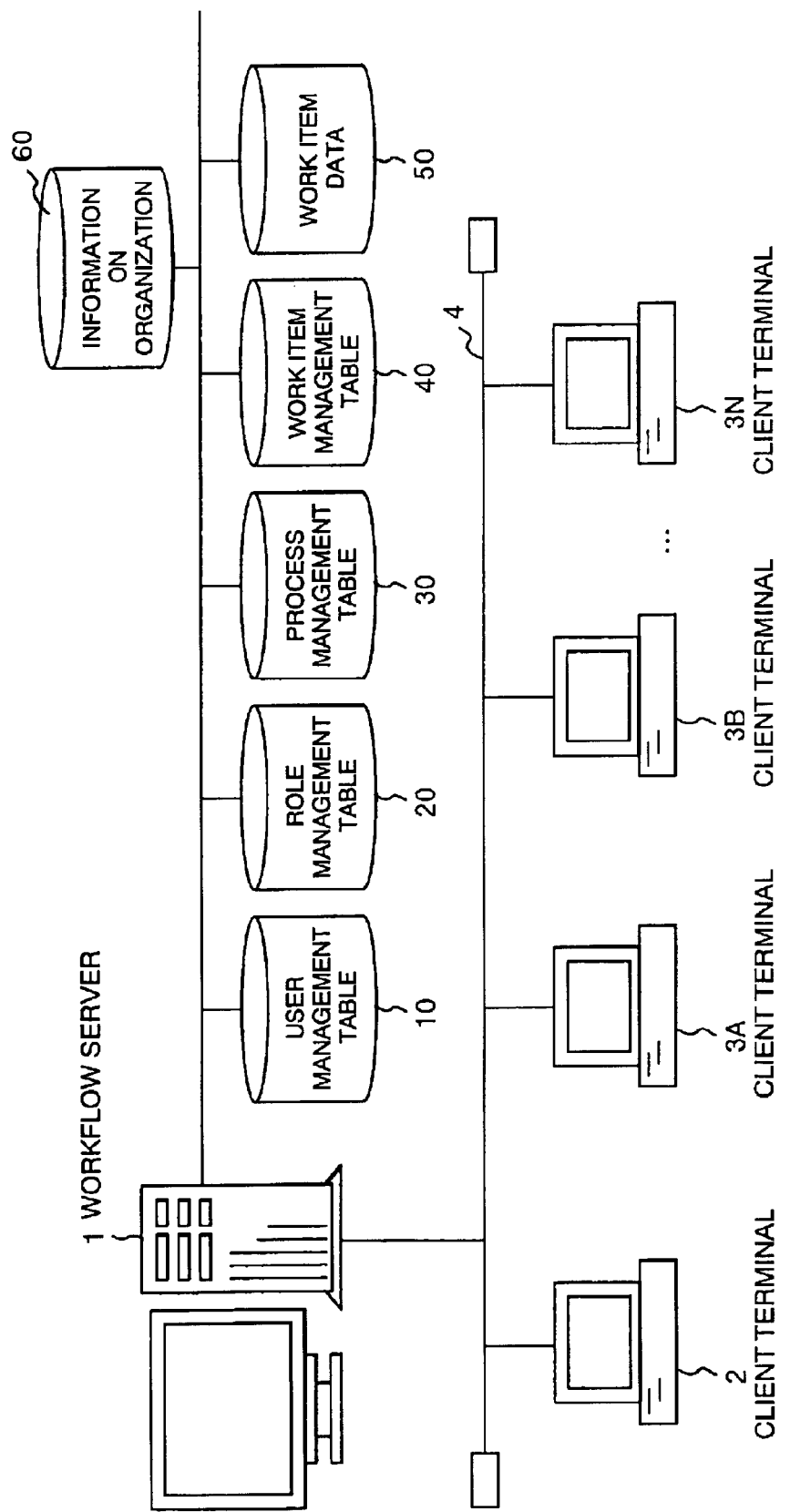
FIG. 2 is a block diagram showing the configuration of the workflow system according to the invention.

FIG. 2 shows the configuration of the workflow system according to the invention.

The workflow system comprises a workflow server 1, a client terminal 2 used by a system manager, and a plurality of client terminals 3 (3A to 3N) used by general users. These components are connected to each other via a LAN 4.

Reference numerals 10 to 60 denote representative files related to the invention among various information files of the workflow server 1; 10 a file for storing a user management table 100 which defines user information such as the work item list and the list of substitute users in correspondence with the user ID; 20 a file for storing a role management table 200 which defines the list of user IDs in correspondence with the role IDs; 30 a file for storing a process management table 300 which defines node list information in correspondence with a process ID indicative of each work item; 40 a file for storing a work item management table 400 which defines information such as process ID corresponding to work ID, present node ID, and history list for each work item ID; 50 a file for storing electronic document data as the body of each work item; and 60 a file for storing organization information of a company to which the workflow system is applied.

Each of the user management table 100, role management table 200, and process management table 300 is generated/updated by registering/modifying the data from the client terminal 1 by the manager. The work item management table 400 is generated for each work item newly generated in the client terminal 3 by the user and is automatically updated as the process progresses.

Figure 3:
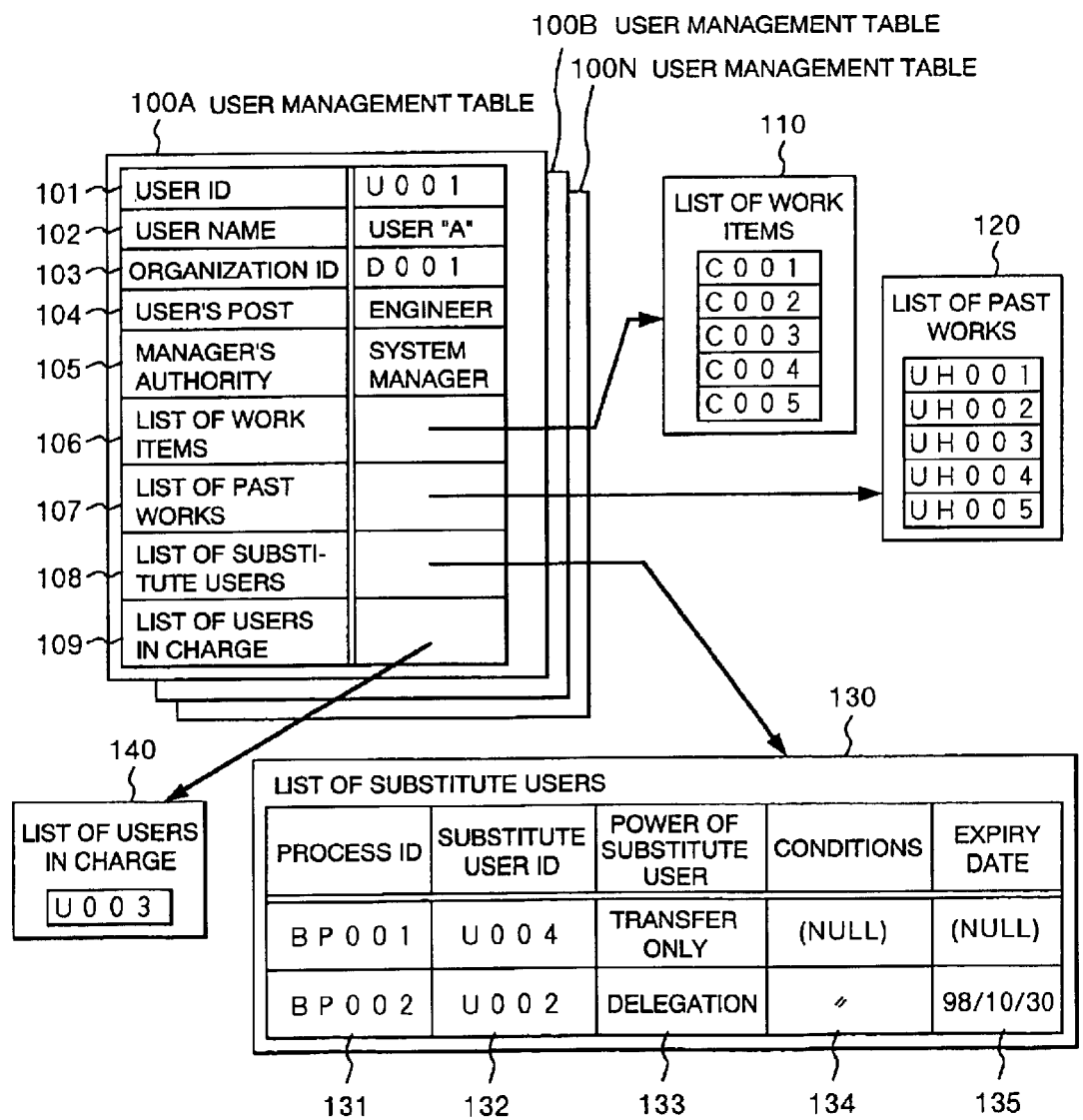
FIG. 3 shows an example of the structure of a user management table 100 stored in a file 10 in FIG. 2.

FIG. 3 shows the structure of the user management table 100 stored in the file 10.

The user management table 100 (100A, 100B, . . . 100N) is prepared for each user. Each table 100 includes user ID 101, user name 102, organization ID 103 to which the user belongs, user's post 104, manager's authority 105, pointer 106 to a list 110 of work items, pointer 107 to a list 120 of past works, pointer 108 to a list 130 of substitute users, and pointer 109 to a list 140 of users designated by the user A.

The list 110 of work items is a list of IDs of unprocessed work items which exist on a receiving tray of the user. By using the work item ID stored here, work item data, that is, an electronic document stored in the work item data file 60 can be read out. It is understood that five work items of the work item IDs "C001" to "C005" exist on the receiving tray of the user A in the management table 100A of the user A in the example.

The list 120 of past works shows past works done by the user in the workflow. The past works are operation history information specified by a work ID generated at each node for each work item. In the example, it is known that the user A has done five workflow works of UH001 to UH005. The operation history information is, for example, stored in the work item data file 50 in association with each work item data. When and how a work item was processed by whom can be traced with respect to each user or each work item.

The list 130 of substitute users defines substitute user ID 132 indicative of a substitute user, power 133 of the substitute user showing the limit of an operation on each work item which can be performed by the substitute user, conditions 134 in the case of transferring the work item processed by a substitute user to the next step (node), and expiry date 135 showing the expiry date of the power of substitute. The requirements impose predetermined restrictions on the process to the work item of other person performed by the substitute user to prevent an unjust process.

In the example of the diagram, with respect to the process name indicated by "BP001", the user A gives the power limited to a "transfer process" to the user having the user ID of "U004". When "BP001" is process ID of settlement of travel expenses and "U004" is the user ID of the user D, the user D has the power of substitute with respect to the transfer process of the work item shown in FIG. 1. Similarly, when "BP002" is process ID of ordering of materials and "U002" is the user ID of the user B, the user B has the delegation with respect to the work item shown in FIG. 1.

For example, if the substitute user is obliged to transfer a work item to a responsible person (such as superior) before automatically transferring the work item to the next node as the condition 134, an indirect transfer control is realized.

That is, the processed work item is transferred from the substitute user to the responsible person and, after being approved by the manager, the work item is transferred to the next user in charge in the workflow. It is also possible to authorize, as the power 133, a specific substitute user having the role like a secretary only to distribute (allocate) a received work item of an absentee. The specific substitute user transfers unprocessed work items accumulated on the receiving tray of the absentee to respective receiving trays of substitute users.

When a group name such as name of a department to which the substitute user belongs or post name is designated as the substitute user in place of the user ID, the workflow server 1 obtains all of users belonging to the group from the organization information file 60 and displays them on the user's terminal. A substitute user selected or approved by the user is added to the list 130 of substitute users.

The list 140 of users in charge is a list of user IDs of other users in charge when the user is designated as a substitute user by the other users. In the example shown in the diagram, the user A is designated (authorized) as a substitute user by another user of the user ID "U003" and can process work items accumulated on the receiving tray of "U003" for the another user. In this case, work items (process ID) which can be processed by the user A and the limit of the power are defined by the list 130 of substitute users in the user management table of the user ID "U003".

Figure 4:
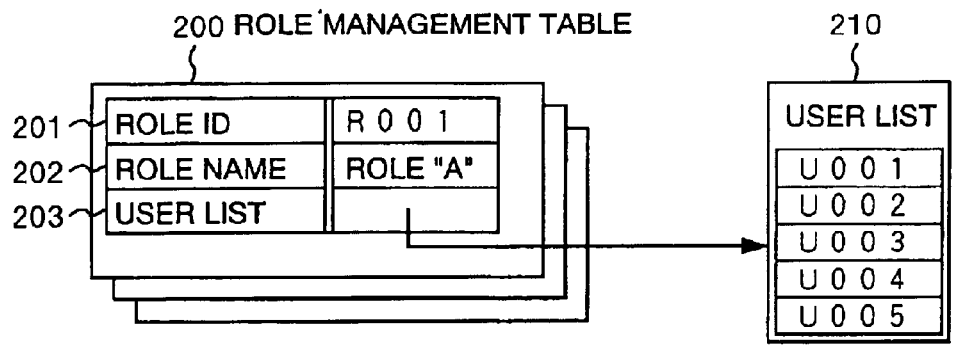
FIG. 4 shows an example of the structure of a role management table 200 stored in a file 20 in FIG. 2.

FIG. 4 shows an example of the structure of the role management table 200 stored in the file 20.

The role management table 200 defines, for each role, role ID 201, role name 202, and pointer 203 to a user list 210. The user list 210 is a list of IDs of users belonging to the role. In the example shown in the diagram, the role A has an identifier "R001" and five users having user IDs "U001" to "U005" belong to the role A.

Figure 5:
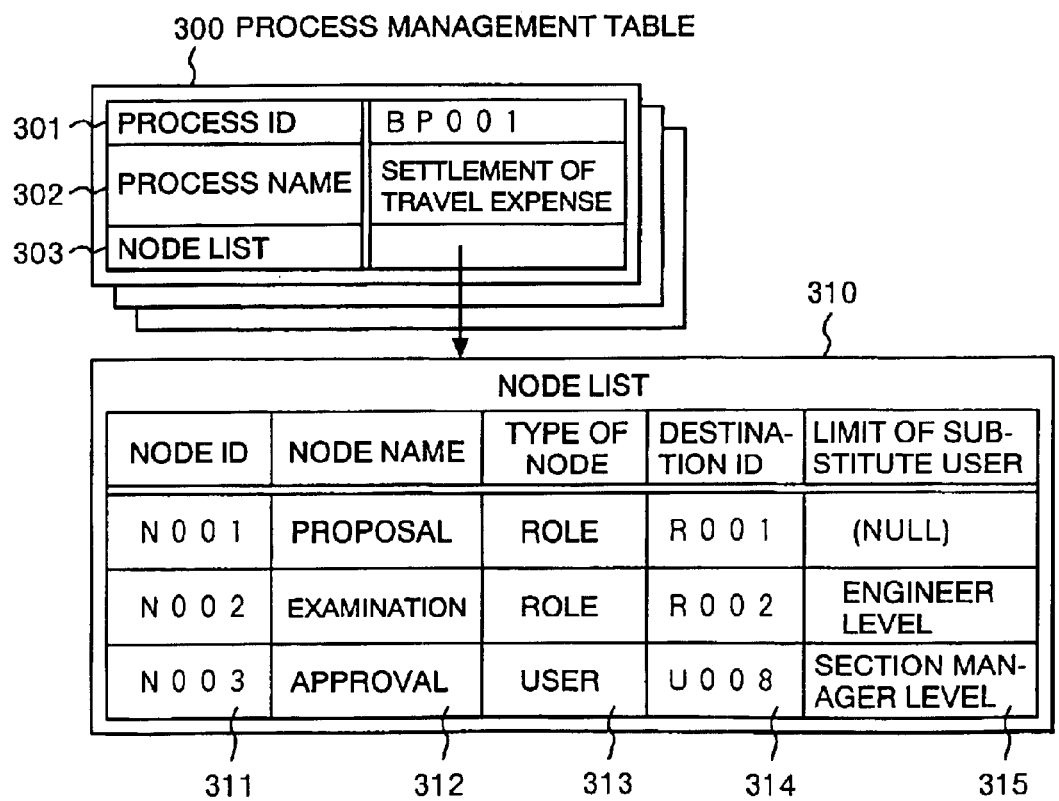
FIG. 5 shows an example of the structure of a process management table 300 stored in a file 30 in FIG. 2.

FIG. 5 shows an example of the structure of the process management table 300 stored in the file 30.

The process management table 300 defines process ID 301, process name 302, and pointer 303 to a node list 310 for each business process. The node list 310 defines node ID 311, node name 312, type 313 of node, destination ID 314, and limit 315 of substitute user for each of nodes constructing the business process.

The type 313 of a node indicates that the destination of a work item at the node is a user (individual unit) or a role (group unit). When the type 313 of the node is a role, role ID indicative of the destination of the work item is set in the destination ID 314 in the next column. The user list 210 corresponding to the role ID 314 is retrieved from the role management table 200 shown in FIG. 4 and a work item is sent to a selected user in a plurality of users belonging to the role. When the type 313 of the node is a user, the user ID is set in the destination ID 314.

In the limit 315 of the substitute user, the limit (qualification) of the user who can process the work item received at the node for the user in charge is set. The limit 315 is set by the system manager when a business process is registered. The user in charge of the work item can designate a substitute user within the set limit.

Figure 6:
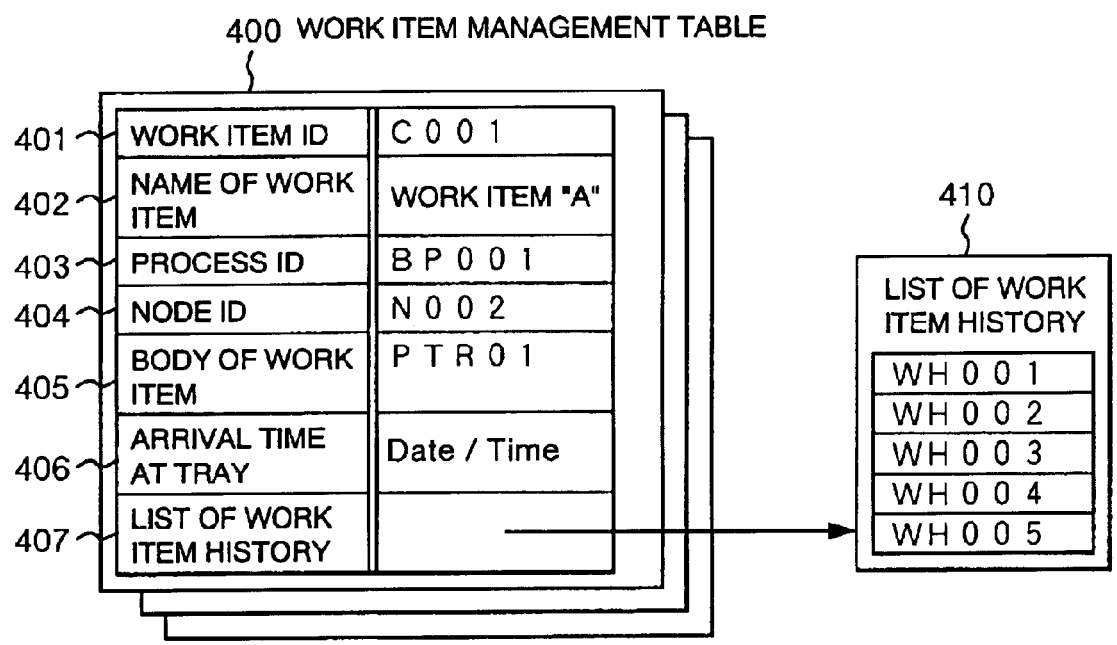
FIG. 6 shows an example of the structure of a work item management table 400 stored in a file 40 in FIG. 2.

FIG. 6 shows an example of the structure of the work item management table 400 stored in the file 40.

The work item management table 400 stores, for each work item, work item ID 401 as a work item identifier in the workflow system, name 402 of the work item, ID 403 of a business process to which the work item belongs, a node ID 404 showing the present position of the work item in the business process, the body 405 of the work item (pointer) indicating the position of the body data of the work item in the work item data file 50, arrival time 406 at the tray indicative of time at which the work item arrives at the present node, and pointer 407 to a list 410 of work item history.

The list 410 of work item history has history from the creation of each work item to the present. In the example shown in the diagram, it is understood that the work item A has been subjected to five processes indicated by work identifiers "WH001" to "WH005". By reading a work record on the basis of the list 410 of work item history with respect to each work item specified by the work item ID 401, the user can recognize the details (time, person, and the contents) of a process performed on the work item.

Figure 7:
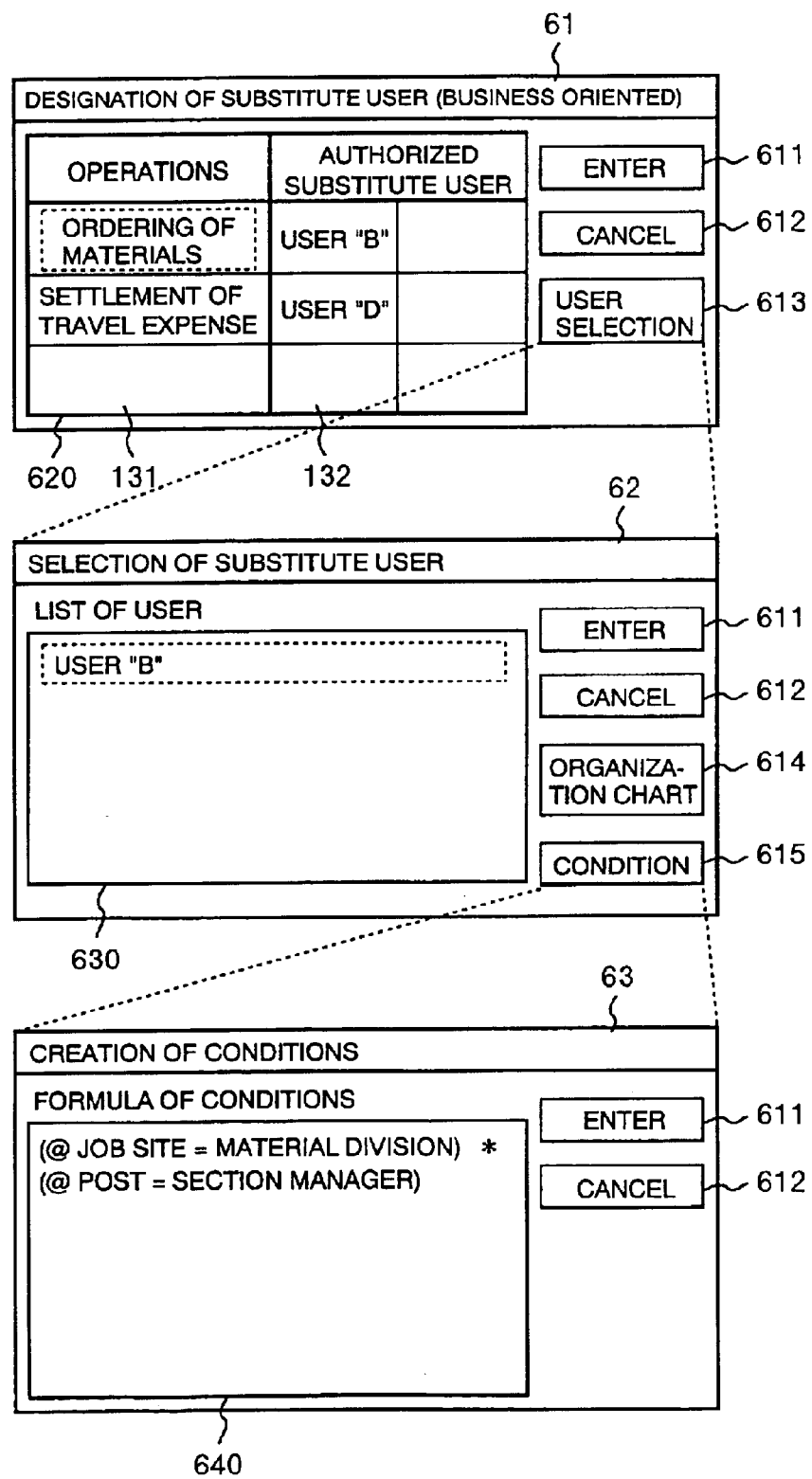
FIG. 7 shows an embodiment of a dialog box for designating a substitute user.

FIG. 7 shows an example of a user selection dialogue box referred to by the user in order to select a substitute user in a client terminal.

In a dialogue box 61, a window 620 displaying operations 131 which can be performed by substitute users (hereinbelow, called assignable operations) and authorized substitute users 132 is created. The dialogue box 61 includes operation buttons of an entering button 611 for designating a displayed user as a substitute user, a cancellation button 612 for canceling the operation of selecting substitute users, and a user selection button 613.

The window 620 is opened when the workflow server 1 refers to the file 10 on the basis of the user ID of the user himself/herself who has requested to select a substitute user and edits the list 130 of substitute users in the user management table 100 corresponding to the user ID. In actual applications, as will be described hereinafter, the process management table 300 is used besides the list 130 of substitute users, so that the dialogue 61 of designating substitute users is edited by covering processes to which the user relates in the window 620.

A dialog box 62 is an entry dialog box for designating a substitute user with respect to one of the assignable operations 131, which has been selected on the initial dialog box 61. When a user selection button 613 is clicked on the designation dialog box 61, the dialog box 62 is created. In the case of designating a substitute user for a new operation which is not displayed, the operation name is added to the column of the assignable operations and the user selection button 613 is clicked.

On the dialog box 62, besides a window 630 for displaying the user being designated as a substitute user at present, as operation buttons, an entering button 611, a cancellation button 612, a button 614 for opening an organization chart window, and a button 615 for opening a condition entry window are displayed.

In the case of newly designate a substitute user, the cursor is moved onto the window 630 and the name of the substitute user is entered from the keyboard. In the case of changing the present substitute user (user B in the example) displayed on the window 630 to another substitute user, it is sufficient to erase the user name being displayed and enter the name of the user to be newly designated from the keyboard.

A dialog box 63 is displayed when the condition creation button 615 is clicked on the substitute user entering dialog box 62. The dialog box 63 is used to designate a substitute user in the form of an abstract formula of conditions instead of designating the substitute user by the user name. In the example shown in the diagram, a person who belong to "material division" and has a post of "section manager" is designated as a substitute user. By using the dialog box 63, the substitute user can be designated even when the user does not know the correct name and user ID of the person. When the formula of conditions is entered in the dialog box 63, the workflow server 1 retrieves the user who satisfies the formula of conditions from the organization information file 60 and regards the user as the user entered in the dialog box 62.

Figure 8:
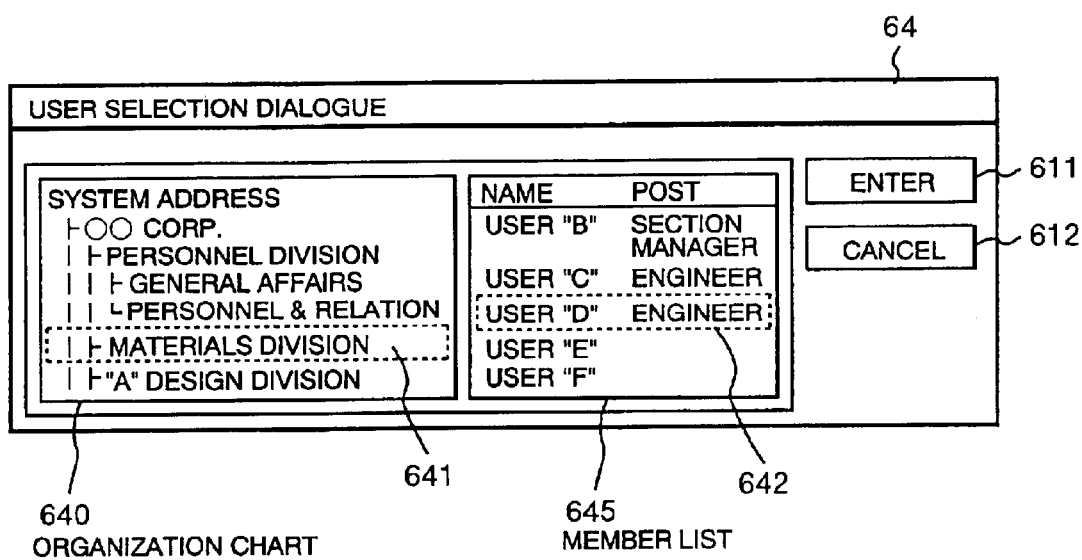
FIG. 8 shows an example of a dialog box for selecting a user with an organization chart.

FIG. 8 shows an example of a user selection dialog box 64 displayed when the organization chart button 614 is clicked in the substitute user entering dialog box 62.

The dialog box 64 is created on the basis of the organization information stored in the organization information file 60 and includes a window 640 for displaying an organization chart and a window 645 for displaying a list of members belonging to a specific division 641 selected from the organization chart. Data outside of the window of each of the organization chart and the member list can be moved within the display range by a scroll function.

The user selects a division 641 to which a user as a substitute belongs in the organization chart window 640, selects a substitute user 642 in the member list displayed in the window 645, and clicks the entering button 611. In such a manner, a new substitute user can be added to the column 132 of authorized users with respect to the selected operation in the dialog box 61 shown in FIG. 7.

Figure 9:
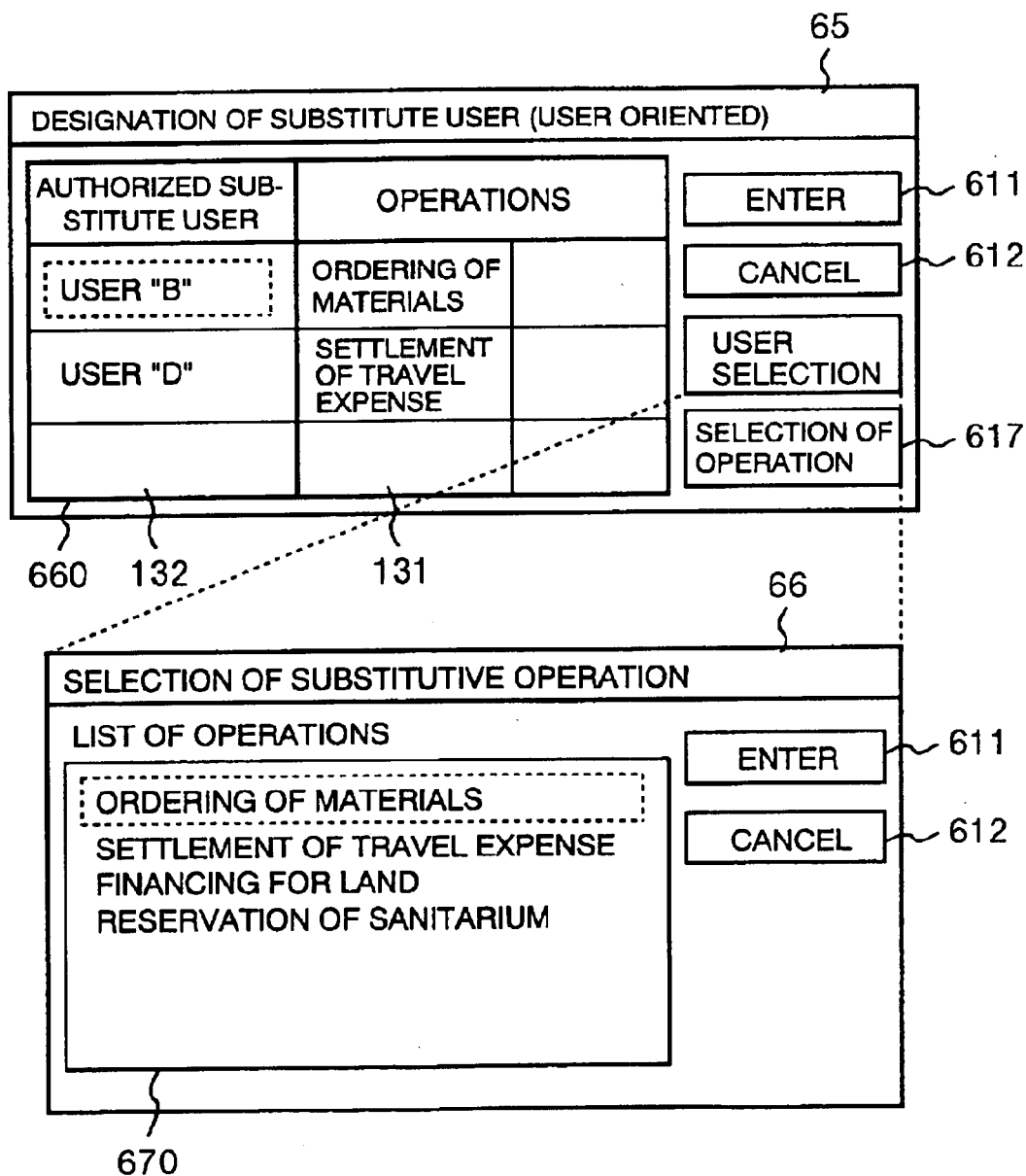
FIG. 9 shows another embodiment of the dialog box for designating a substitute user.

FIG. 9 shows a dialog box 65 of another embodiment as an alternative of the substitute user designation dialog window 61 shown in FIG. 7.

The dialog box 65 is used to assign a task to each user as a substitute. The arrangement of the authorized substitute users 132 and the assignable operations 131 in a window 660 is opposite to the arrangement in the window 620 in the dialog box 61.

In the dialog box 65, when the substitute user 132 is designated and an operation selection button 617 is clicked, an assignable operation selection dialog box 66 is displayed. The dialog box includes a window 670 for displaying a list of operations in the division to which the substitute user 132 belongs. By selecting one of the assignable operations displayed in the window and clicking the entering button 611, the assignable operation 131 in the dialog box 65 can be designated.

In each of the cases using the substitute user designation dialog boxes 61 and 65, the workflow server 1 checks the limit 315 of the substitute user defined by the node list in the corresponding process management table 300 with respect to the post of the substitute user obtained from the organization information file 60 and the assignable operations 131. Only when the condition of designating a substitute user is satisfied, the list 130 of substitute users is updated. At this time, the conversion from the user name and the operation name displayed on the substitute user designation dialog box 61 to the user ID and the process ID of the list 130 of substitute users is automatically performed by the workflow server 1. When the substitute user name and the substitution designating conditions are not satisfied, a warning message is outputted to the client terminal as a request source to demand a change in the contents of the substitution designation.

In FIGS. 7 to 9, to make the explanation simpler, only the relation between the substitute user 132 and the operation (process ID) 131 among items in the list 130 of substitute users has been described. By adding an item display column to each of the substitute user designation dialog boxes 61 and 65, the other items 133 to 135 in the list 130 of substitute users can be easily designated.

Figure 10:
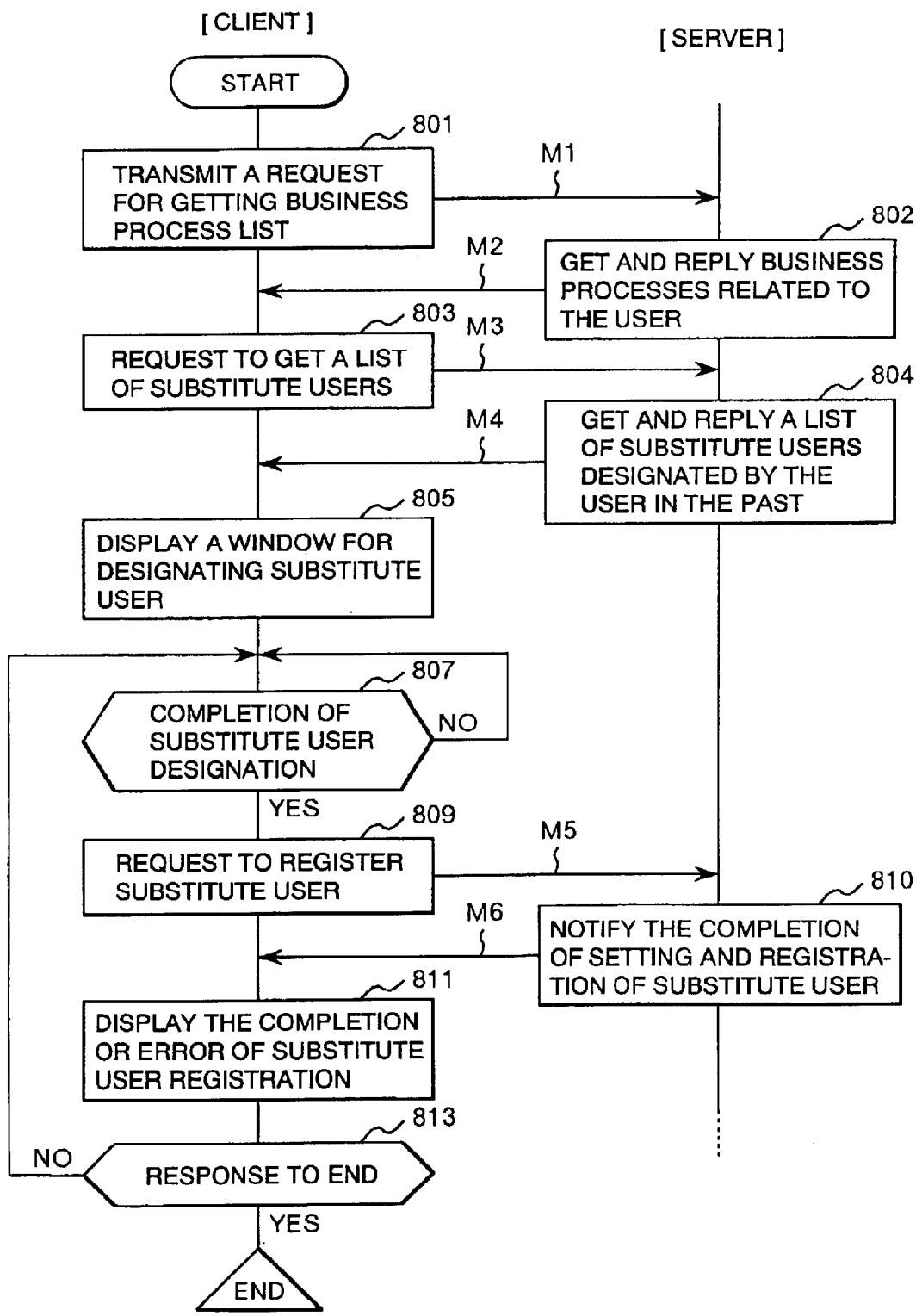
FIG. 10 is a flowchart showing an operational sequence of the workflow system of the invention in a substitute user registering process.

FIG. 10 is a sequence diagram showing the operation of the client terminal 3 and the workflow server 1 in the substitute user registration.

In the case of registering a substitute user, the user (hereinbelow, called a user in charge) of the client terminal 2 starts a substitute registration routine by, for example, selecting an icon appearing on the initial screen of a workflow client module. When the selecting operation is performed, the client terminal requests the workflow server 1 to transmit a list of business processes to which the user ID of the user in charge is related by sending a request message M1 (step 801).

Upon receipt of the request message M1, first, the workflow server 1 refers to the user list 210 in each role information management table 200 stored in the file 20 and retrieves the role ID 201 of the role to which the user in charge belongs. Then the workflow server 1 refers to the node list 310 in each process information management table 30 stored in the file 30, retrieves a process including the retrieved role ID as the destination ID 314 and a process including the user ID of the user in charge as the destination ID 314, generates a response message M2 including the list of the process ID 301 and the process names 302 of the processes, and transmits the response message M2 to the client terminal 3 as a request source (step 802). The client terminal 3 which has received the response message M2 requests the workflow server 1 to send a list of substitute users corresponding to the user ID of the user in charge by a new request message M3 (step 803).

Upon receipt of the request message M3, the workflow server 1 refers to the user management table 100 corresponding to the user ID of the user in charge, generates a response message M4 including the contents data of the list 130 of substitute users and transmits the response message M4 to the client terminal 3 as a request source (step 804).

When the response message M4 is received, the client terminal edits the above-mentioned substitute user designation dialog box 61 (or 65) on the basis of the list of the business processes which has been received by the message M2 and the list of substitute users obtained this time and displays the dialog box 61 on the display screen (step 805).

The user performs an entry operation for designating the substitute user by the procedure described by referring to FIGS. 7 to 9 (step 807). When the entry operation for designating the substitute user is finished, the client terminal 3 creates a substitute user registration request message M5 including substitute user designation information describing the substitute user, power, condition, and term for each task and the user ID of the request source and transmits the message M5 to the workflow server 1 (step 809).

When the message M5 is received, the workflow server 1 checks whether or not each of the substitute users included in the substitute user designation information satisfies the conditions specified by the substitute user limit 315 in the process information management table 300 with respect to each of assignable operations. When there is no problem in the relation between the assignable operation and the substitute user, the workflow server 1 updates the contents of the list 130 of substitute user corresponding to the user ID of the request source on the basis of the received data. The workflow server 1 accesses the user management table corresponding to each substitute user ID and registers the user ID of the request source (ID of the user in charge) in the list 140 of users in charge. When the data processes are completed, the workflow server 1 generates a response message M6 indicative of the completion of the substitute user registering process and transmits the message M6 to the client terminal 3 (step 810). When the designated substitute user is not qualified in any of the assignable operations, in place of the response message M6, an error message describing the relation among the erroneous substitute user, the assignable operation and the cause of the error is transmitted.

When the message M6 is received, the client terminal 3 displays a message indicative of the completion of registration of the substitute user or an error message on the display screen and waits for a response from the user (step 811). When the user sends a response indicative of the end of registration (step 813), the processing routine is finished. In the case where the entry operation for correcting the substitute user is executed on the substitute user designation dialog box in a state where the error message is outputted, the program returns to step 807.

When the substitute user is designated by the formula of conditions on the condition creation dialog box 63, the workflow server 1 retrieves the user satisfying the conditions from the organization information file 60 and replaces the formula with the corresponding user ID.

Figure 11:
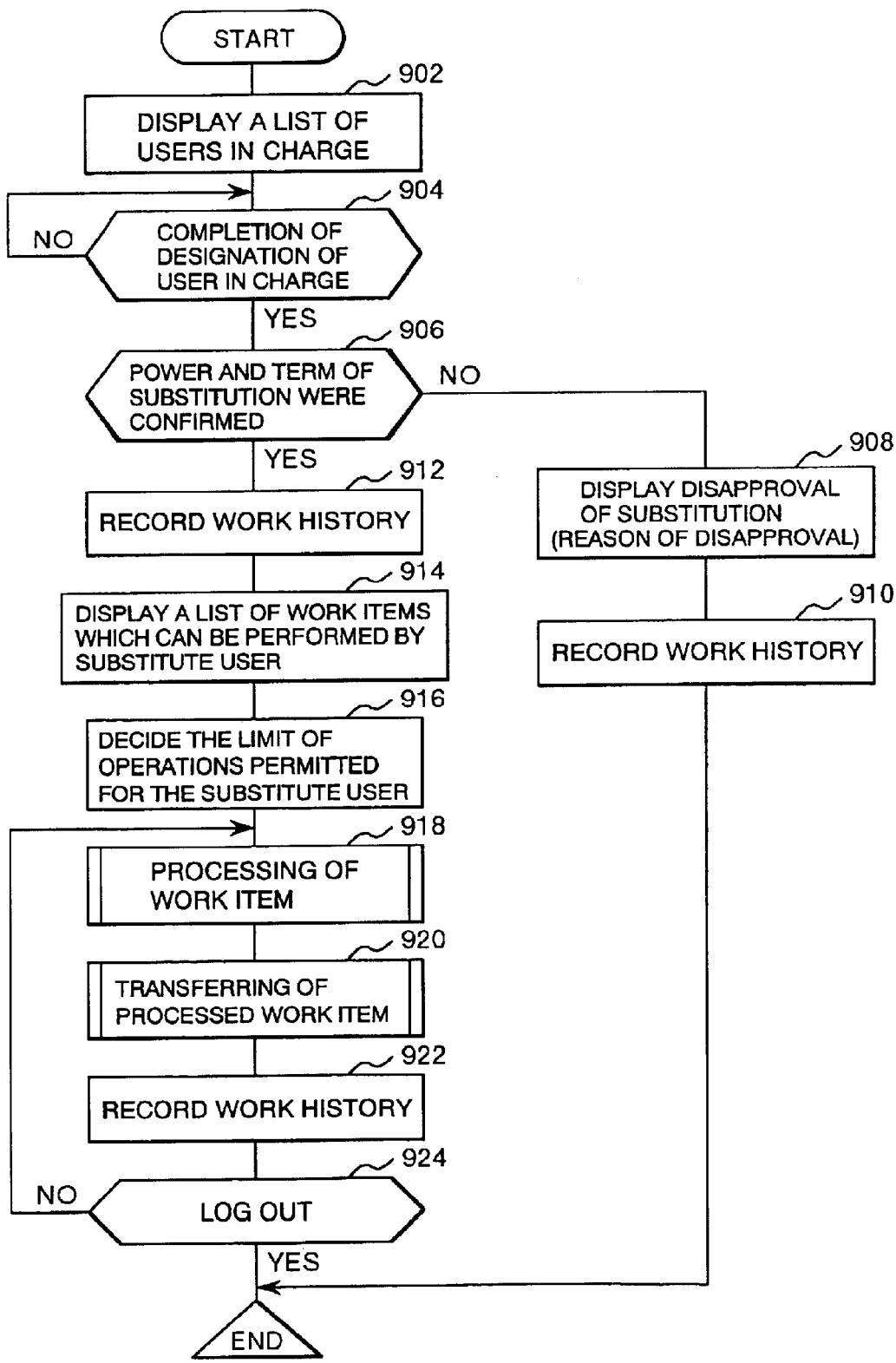
FIG. 11 is a flowchart showing an operational sequence of the workflow system of the invention in a process performed by a substitute user.

FIG. 11 shows an operation sequence of a substitution process routine executed when another user designated as a substitute user processes a work item received on the tray of an absentee in the workflow system of the invention.

A work item is processed for the user in charge by exchanging messages between the client terminal 3 and the workflow server 1 in response to the user operation. Since the function of the client terminal 3 is mainly to transmit/receive information to/from the workflow server 1, to make the explanation simpler, the client terminal 3 and the workflow server 1 are not regarded as separate components but the client terminal is dealt as a part of the workflow server.

The substitution process routine is started when the user of the client terminal selects a specific icon on the initial screen of the workflow client module.

When the substitution process routine is started, the workflow server 1 first refers to the user management table 100 corresponding to the user ID of the terminal user, gets the IDs of the users in charge registered in the list 140 of the users in charge, converts the IDs of the users in charge into the user names and outputs the user names as a list of users in charge on the display screen (step 902).

Figure 12:
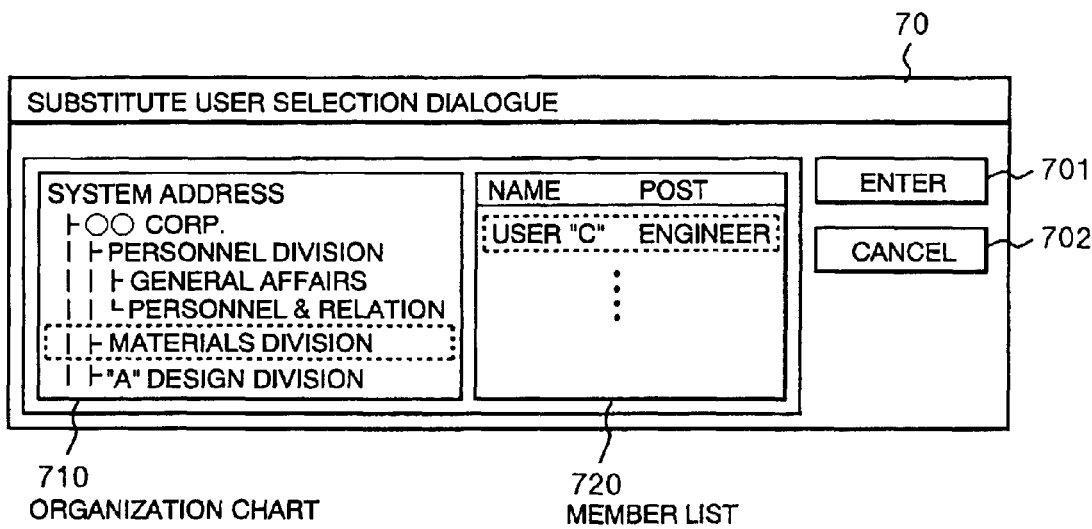
FIG. 12 shows an example of a dialog box displaying a list of users in charge.

In this case, for example, as shown in FIG. 12, it is also possible to provide an organization chart display window 710 and a window 720 for displaying the names of the users in charge on a display dialog box 70 of the list of the users in charge. When one of the users in charge is selected from the window 720, the display of the division to which the selected user in charge belongs may be changed in the organization chart so that the division of the user can be known at a glance. The designation of the user in charge is performed by selecting one of the users in charge displayed in the window 720 on the dialog box 70 of FIG. 12 and is completed, for example, by clicking an entering button 701.

The workflow server 1 waits for the designation of the substitute in charge. When a terminal user (for example, the user B) designates a user in charge (for example, the user A), the workflow server 1 checks whether the user B is qualified as a substitute of the user A in charge or not (step 906). The check is made by referring to the list 130 of substitute users in the user management table 100A on the basis of the user ID of the user A in charge and determining whether or not the user B is registered as the substitute user ID 132 and whether or not the substitution term is not expired.

When the user is a system manager, even if he/she is not registered in the list 130 of substitute users, the system manager may have the qualification for a substitute.

When it is determined by the qualification check that the user B is not qualified for a substitute, a message indicating that the user B cannot be a substitute is displayed on the display screen (step 908), history data indicating a failure in the substitution process is recorded in the list 120 of past works of each of the user B and the user A in charge (step 910), and the routine is finished.

In the case where the user B is qualified for a substitute of the user A in charge, the fact is recorded in the work history 120 of each of the users A and B (step 912). After that, a work item in the list 110 of work items of the user A in charge, that is, a work item which can be processed by the user B is selected from the unprocessed work items accumulated on the receiving tray of the user in charge and a list of selected work items is displayed on the dialog box (step 914). The selection of the work items is performed by reading out the process ID 131 permitted to the user B as a substitute from the list 130 of substitute users of the user A in charge and selecting work items having the process ID 403 in the work item management table 400 which coincides with the process ID 131 from the work items ID in the list 110.

The workflow server 1 reads out the power 313 and the conditions 314 from the list 130 of substitute users of the user A in charge in correspondence with the ID 131 of the process which can be executed by the user B as a substitute, decides the limit of operations permitted for the substitute user B (step 916) and waits for the work item to be processed.

The user B sequentially selects work items from the list of work items permitted for the substitute user displayed on the screen and processes each of the selected work items (step 918). The work item is processed by referring to the work item management table 400 corresponding to the work item designated by the user from the list, reading out an electronic document from the work item data file 50 in accordance with the work item body pointer 405 and outputting the electronic document onto the display screen.

The user B enters data by operating the keyboard or the like to the displayed electronic document. When a necessary data process is completed, the user instructs the server 1 to transfer the processed work item to the next step (next node). In the work item process, the workflow server 1 permits the data process within the limit of the substitution permitted to the user B.

On receipt of the instruction of transferring the processed work item from the user B, the workflow server 1 stores the work item into the work item data file 50 and obtains the ID 311, the node type 313, and the destination ID 311 of the next node from the node list 310 in the process management table 300 corresponding to the work item. The work item is transferred to the next node by deleting the ID of the processed work item from the work item list 110 of the user A in charge and adding the work item ID to the work item list 110 in the user management table 100 of the next user specified by the destination ID 311 of the next node (step 920).

In association with the transfer of the work item, the workflow server 1 updates the node ID 404 to the next node ID in the work item management table 400 corresponding to the processed work item, updates the tray arrival time 406 to the present time, records that the user B has processed the work item at that time for the user in charge in the work item history list 410, and records the time and the ID of the work item processed for the user in charge in the list 120 of past works in the user management table 100B corresponding to the user B (step 922). The work item history can be recorded in such a manner that the history body data is recorded in the work item data file., and the pointer address to the body data is kept in the list 120 of past works. Consequently, the contents of the process added by the user B to the work item can be also linked to the history data.

The workflow server 1 monitors the entry operation by the user (step 924). When the user B instructs log-out from the substitution process, the workflow server 1 finishes the routine. When the user B selects the next work item from the list of work items permitted to the user B, the program returns to the work item process step 918 and the above-mentioned data process is repeated.

The work item process by another person as the substitute user is executed either by a voluntary intention of each substitute user or on the basis of the predesignation by the user in charge. As an embodiment of the invention, it is also possible that the workflow server 1 issues a message (demand message) requesting a client terminal of the substitute to process a work item so that the work item processing is triggered off by the message.

Figure 13:
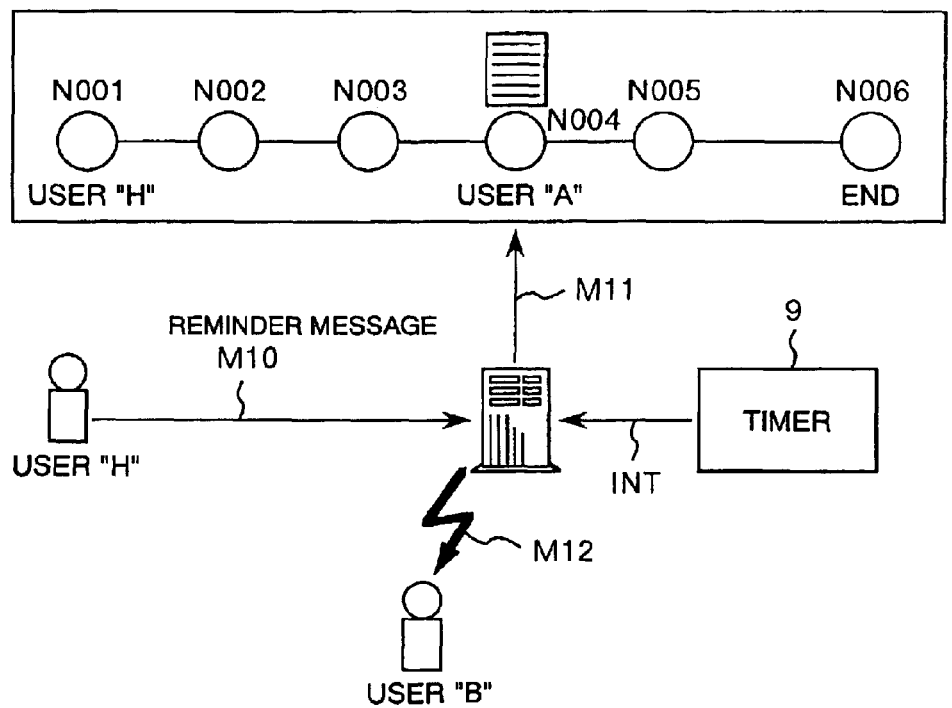
FIG. 13 is a diagram for explaining automatic issuance of a work item process request message M11 and a substitute process request message M12 in the workflow system of the invention.

For example, as illustrated in FIG. 13, a case where a work item created by the user H is left undone on the receiving tray of the user A at the node N004 in a business process comprised of nodes N001 to N006 is assumed.

As a function of the workflow server 1, the workflow server 1 is provided with a function 9 of periodically monitoring each work item management table 400 and, when a work item X with elapse time since the tray arrival time 406 exceeding a predetermined threshold is found, generating a timer interruption INT. When the timer interruption is generated, the workflow server 1 specifies the process ID 403 and the node ID 404 of the delayed work item X by referring to the work item management table corresponding to the work item X and specifies the user ID (user A) who stops the work item X from the node list in the process management table 300 corresponding to the process ID. In this case, the workflow server 1 first transmits a message M11 for requesting the process of the work item X to the client terminal of the user A in charge.

When there is no response from the user A or the user A does not process the work after making some retries, the workflow server 1 regards the user A as an absentee, retrieves the substitute user B registered in advance with respect to the process ID 403 of the delayed work item X and transmits a message M12 of requesting the process of the work item X for the user A to the client terminal of the user B.

When the process request message M11 or M12 is received, for example, the client terminal displays an alarm message in a pop-up dialog form. It is preferable that the display color of the work item X left undone is made different from that of the other work items so as to be distinguished in the list of work items displayed for work item selection when the user A in charge or the substitute user B starts processing the work item. In this case, since the work item to be urgently processed is already specified, the display of the list of work items may be omitted. It is also possible to immediately display an electronic document of the work item X on the screen when the user responds to the alarm message so that the electronic document can be processed.

The monitoring of time by the timer may be performed only with respect to a work item specified to be urgently processed at the time of creation. As another embodiment, in place of the monitoring of time, the number of work items accumulated on the receiving tray may be monitored. When the number exceeds a predetermined threshold, a request to process the work item may be issued to the user in charge and the substitute user.

Besides the monitoring of time or the monitoring of the number of work items, the workflow server 1 may send a message requesting the process of the work item X to the user A in charge or the substitute user B when a message M10 of requesting a process on the work item X is received from another user related to the delayed work item X, for example, a creator H.

In this case, for example, in response to the request of displaying the work history from the user H, the workflow server 1 may output the work items in the list 120 of past works of the user H on the screen and access the work item management table 400 and the process management table 300 with respect to the work item selected by the user from the list, thereby displaying the status display dialog box indicating whether the process on the designated work item has been completed or not. In the case where the process on the work item has not been completed yet, the status display dialog box indicating the tray on which the work item has been left undone and since when is displayed. If a reminder button is prepared in the status display dialog box, the user H can instruct a transmission of a reminder message M10 with respect to the work item X by clicking the reminder button. Since the position where the work item is stopped can be known from the status display dialog box, the user H can directly remind the user A by telephone prior to the transmission of the reminder message M10.

As a special embodiment of the invention, in order to limit the execution of the work item process by the substitute user, the substitute user may be permitted to execute the work item only when the request of the substitute process is received from the workflow server.

Specifically, only when the process by the substitute user is really necessary such as the cases where an urgent work item is arrived at the receiving tray of the user in charge, a work item is remained or left undone for a long time, or the number of work items left undone exceeds a threshold, the process request message is transmitted from the server to the client terminal of the substitute user and, when the substitute user responds to the message, a chance of executing the substitute process routine shown in FIG. 11 is given. In this case, since the user in charge is already specified, the display of the list of users in charge and the selecting processes can be omitted.

Although some embodiments of the invention have been described above on the basis of the drawings, the invention includes many other modifications within the scope of claims and within the technical ideas described as means for solving the problem. The invention is not interpreted by being limited to the foregoing embodiments shown in the diagrams.

According to the workflow system of the embodiments, the work item transferred to a specific user can be accessed by both of the user and a predesignated substitute user. Consequently, even when the user is absent without changing the status of the receiving tray of himself/herself to "unacceptable", the substitute user can process the work item while the user in charge is absent and transfer the processed work item to the next person in charge (next node in the business process) in the workflow. Since either the user in charge or the substitute user can process the same work item, the work items can be processed by both the user in charge and the substitute user depending on the accumulating state of work items.

Each user designates a substitute user for each work to which the user in charge is related, and the power of the substitute user, the conditions of the process performed for the user in charge, or the effective term of the power of substitution is set as necessary, thereby enabling the power of substitution by the substitute user to be prevented from being abused. Further, on the workflow server side, the qualification for the substitute user which can be designated for each node of each business process is predefined, the qualification of each substitute user designated by each user is checked, and the designation of the substitute user who is not qualified is refused, thereby enabling unjust substitute designation and a work item process performed by an inappropriate substitute to be prevented.

According to the embodiments, by employing the user interface in a form such that the list of persons (users in charge) who designate the operators of the client terminals as substitute users is displayed and the operator designates one of them from the displayed list prior to execution of the process, the operations of designating the user in charge for the substitution process and reading out of the work item to be performed by the substitute user to the terminal screen can be easily realized.

According to the embodiments, the reminder message to the user in charge of the work item or the message of requesting the substitute to process the work item for the user in charge is issued from the workflow server in accordance with the accumulation state of the work items on the receiving tray of the user or with respect to the special work item urged by another user. Consequently, the process of the delayed work item is urged and the period in which the work item is left undone can be shortened.

According to the invention, even when the user in charge of a process in the workflow is absent, the substitute user can process the work item.

What is claimed is:

1. A workflow server which is connected to a plurality of client terminals for processing an electronic work item and which transfers a work item generated or processed at each of the client terminals to a next user in charge in accordance with a prespecified process flow, comprising:

a process management table defining the relation between an identifier of each of nodes constructing a business process and a destination of a work item in correspondence with a business identifier;

a user management table linked to management information of each of the users of the client terminals, for indicating a list of work items transferred to the user and information regarding a substitute user designated by the user in charge in association with each node operation;

a controller for allowing according to the user management table, with respect to at least one work item, both a user in charge to whom the work item is transferred and a substitute user predesignated by the user in charge to access the work item, and directly or indirectly transferring the work item processed by either user to the next user in charge according to the process management table; and a display for displaying, in response to a request from any requesting client terminal, a list of users who are designating the user of the requesting client terminal as a substitute user on the client terminal, wherein the substitute user specifies the user in charge to access the work item by referring to the list of users.

2. A workflow server according to claim 1, wherein when any user of the client terminals specifies a user serving as the user in charge and requests display of a work item to be performed by the user of the client terminal as a substitute user, said controller checks qualifications of the user of the request source client terminal for a substitute user by referring to the user management table corresponding to the user in charge and specifies work items to be displayed for the substitute user.

3. A workflow server according to claim 1, wherein the user management table includes identification information of a substitute user designated for each process by the user in charge in association with identification information of each of the users of the client terminals, wherein when a request of starting the substitution process with respect to a work item received by another user is sent from a user other than the destination user of the work item, the controller refers to the information stored in the user management table corresponding to the another user, checks the qualifications of the request source user for a substitute of the another user, and specifies a work item which can be permitted to the user.

4. A workflow server according to claim 1, wherein the user management table includes identification information of a substitute user designated for each process by the user in charge, and identification information of a user in charge who designates the substitute user in association with identification information of each of users of the client terminals; and the controller comprises means for creating, when a request of starting the substitution process with respect to work items to be processed by another user is received from a user other than the destination of the work item, a dialog box for selecting a user in charge on the client terminal as a request source on the basis of identification information of the user in charge stored in the user management table corresponding to the request source user, and means for specifying, when a user in charge is designated by the request source user, work items which can be processed by the request source user instead of the user in charge by referring to information stored in the user management table corresponding to the designated user in charge after checking the qualifications of the request source user for working as a substitute user.

5. A workflow server according to claim 3, wherein the user management table includes at least one of power of substitute, substitution conditions, and substitution effective term besides identification information of the substitute user designated by each user for each process, and said controller checks whether the identification information of the request source user has been registered in advance or not and at least one of the power of substitute, substitution conditions, and substitution effective term at the time of checking qualifications of the request source user.

6. A workflow server according to claim 1, wherein the user management table includes, in correspondence with the identification information of each of the users of the client terminals, identifiers of unprocessed work items, an identifier of the substitute user designated by the user in charge, and an identifier of a user in charge indicative of another user who designates the client terminal user as a substitute, the workflow server further comprises a work item management table for storing, in correspondence with a work item identifier, an identifier of a business process to which the work item belongs and an identifier of a node indicating the present position of the work item, and the controller allows both the user in charge who has not yet processed a work item in the user management table and a substitute user registered as a substitute in correspondence with the business process identifier of the work item in the user management table of the user in charge to process the work item, specifies a next node identifier and a destination user from the process management table in accordance with the business process identifier of the work item and the identifier of the node in the present position with respect to the work item processed by each of the client terminals, registers the work item as an unprocessed work item in another user management table corresponding to the destination user, and updates the identifier of the node indicative of the present position to the identifier of the next node in the work item management table corresponding to the work item.

7. A workflow server according to claim 1, further comprising means for transmitting a message for reminding the process of the work item to be urgently processed to at least one of the client terminal operated by the user in charge as a destination of the work item and a client terminal operated by the substitute user designated as a substitute of the work item.

8. A method of controlling a workflow system including a plurality of client terminals and a workflow server for transferring a work item in a process generated or processed by any of the client terminals to a next user in charge in accordance with a predesignated process flow, the method comprising the steps of:

requesting from one of said client terminals to said workflow server to display a work item to be performed by a substitute user by specifying a user in charge who designated the substitute user to process a work item;

selecting by the workflow server an unprocessed work item which can be processed by a user of a request source client terminal as the substitute user among unprocessed work items of the user in charge; and displaying the selected work item on a display screen of the request source client terminal.

9. A method of controlling a workflow system including a plurality of client terminals and a workflow server for transferring a work item generated or processed by any of the client terminals to the next user in charge in accordance with a predesignated process flow, the method comprising the steps of:

specifying by said workflow server, when a request of display of a user in charge is issued from any one of the client terminals, at least one user in charge who designates a substitute user as a user of the request source client terminal, on the basis of management information prepared for each of said substitute users of the client terminals, thereby to display the user in charge on the request source client terminal, and selecting by said workflow server, when the client terminal requests to display a work item to be performed by one said substitute user by specifying the user in charge, at least one of unprocessed work items which can be processed by the client terminal substitute user among unprocessed work items of the user in charge, thereby to display the selected unprocessed work item on the client terminal.

* * * * *